(12) United States Patent
Yates

(10) Patent No.: US 12,517,936 B1
(45) Date of Patent: Jan. 6, 2026

(54) RETRIEVAL-AUGMENTED GENERATION AND RELEVANCY ANNOTATION TO ABORT IMPACT OF IRRELEVANT QUERIES USING GENERATIVE ARTIFICIAL INTELLIGENCE

(71) Applicant: Dropbox, Inc., San Francisco, CA (US)

(72) Inventor: Andrew Donald Yates, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/939,383

(22) Filed: Nov. 6, 2024

(51) Int. Cl.
  *G06F 16/334* (2025.01)
  *G06F 16/3329* (2025.01)
  *G06F 16/338* (2019.01)
  *G06F 16/438* (2019.01)

(52) U.S. Cl.
  CPC ........ *G06F 16/3344* (2019.01); *G06F 16/338* (2019.01); *G06F 16/3329* (2019.01); *G06F 16/438* (2019.01)

(58) Field of Classification Search
  CPC .......................... G06F 16/3329; G06F 16/438
  See application file for complete search history.

(56) References Cited

U.S. PATENT DOCUMENTS

| | | | |
|---|---|---|---|
| 2005/0065959 | A1 | 3/2005 | Smith et al. |
| 2007/0192300 | A1 | 8/2007 | Reuther et al. |
| 2011/0191327 | A1 | 8/2011 | Lee |
| 2015/0046281 | A1 | 2/2015 | Shivaswamy et al. |
| 2019/0340193 | A1* | 11/2019 | Tucey .................. G06F 16/438 |
| 2020/0104305 | A1 | 4/2020 | Wei et al. |
| 2020/0193386 | A1* | 6/2020 | Lyon .............. G06Q 10/063112 |
| 2020/0242144 | A1* | 7/2020 | Yoshida ................ G06F 16/438 |
| 2021/0334886 | A1 | 10/2021 | Clark et al. |
| 2023/0316006 | A1 | 10/2023 | Tunstall-Pedoe et al. |
| 2024/0232199 | A1 | 7/2024 | Hambardzumyan et al. |
| 2024/0256582 | A1* | 8/2024 | Jain ..................... G06F 16/3329 |
| 2024/0256622 | A1 | 8/2024 | Abrams et al. |
| 2024/0289407 | A1 | 8/2024 | Rofouei et al. |
| 2024/0394512 | A1 | 11/2024 | Cunningham et al. |
| 2024/0403373 | A1 | 12/2024 | Chao et al. |

OTHER PUBLICATIONS

Pierce, David. "The AI takeover of Google Search starts now." May 10, 2023. 13 pages. https://www.theverge.com/2023/5/10/23717120/google-search-ai-results-generated-experience-io (Year: 2023).

* cited by examiner

*Primary Examiner* — Farzad Kazeminezhad
(74) *Attorney, Agent, or Firm* — Keller Preece PLLC

(57) ABSTRACT

Methods and systems provide content searching and retrieval using generative artificial intelligence (AI) Models. The system is configured to receive a user search for content, media or item listings. The system receives a natural language-based input associated with a client device of a user. The system generates a search criterion for the received natural language-based input. The system provides a data set of retrieved content items to one or more large language models that annotate each of the content items in the data set. The system receives a new data set with the content items each including a relevancy annotation. Based on the relevancy annotations in the new data the system determines what additional processing to perform.

20 Claims, 8 Drawing Sheets

RETRIEVAL-AUGMENTED GENERATION AND RELEVANCY ANNOTATION TO ABORT IMPACT OF IRRELEVANT QUERIES USING GENERATIVE ARTIFICIAL INTELLIGENCE

FIELD OF INVENTION

Various embodiments relate generally to analysis of machine learning model operations, and more particularly, to systems and methods for retrieval-augmented generation and relevancy annotation using generative artificial intelligence.

SUMMARY

Methods, systems, and apparatus, including computer programs encoded on computer storage media relate to methods of content retrieval, ranking and decision-making. The system provides for retrieval-augmented generation of content items and relevancy annotation of the content items.

As described herein, a system performs retrieval-augmented generation (RAG) and ranking system that employs at least one large language model (LLM) to provide contextual relevance annotation for content retrieved from multiple retrieval systems. These relevance annotations are then used to assemble an optimized presentation of content by another system in combination with traditional statistical inference and other control mechanisms.

Retrieval-Augmented Generation (RAG) ranking leverages the strengths of both LLMs and statistical inference to produce optimal allocations of content in search and recommendation. A Retrieval-Augmented Generation (RAG) system architecture is described where a traditional pool keyword and vector search retrieval systems produces a set of candidate content items. These retrieved content items are input to one or more LLM to an LLM, and the LLM generates a response based on that input. However, unlike the current state of the art, the generative output of this system is not final presentation to end users. Instead, in some embodiments, the system generates an intermediate output that is an input to another statistical inference and allocation system that generates the final presentation to end users. Effectively, the "Generation" is the semantic relevance annotation of a page rather than the presented content to end users. These annotations are inputs to statistical inference and allocation systems that generate the end user response, which is typically an ideal allocation of items in response to a user search query or user recommendations.

This system may include previous LLM or expert label responses as live examples to improve the prompt to the LLM and to estimate the mean and variance in relevance judgements for use in downstream allocation systems. The previous LLM responses may be generated asynchronously using more advanced, but slower and more expensive labeling methods including expert human annotation.

In some embodiments, the computer implemented methods and systems provide content searching and retrieval and provide relevancy annotation using generative artificial intelligence (AI) Models. The system is configured to receive a user search for content, media or item listings. The system receives a natural language-based input associated with a client device of a user. The system generates a search criterion for the received natural language-based input. The system provides a data set of retrieved content items to one or more large language models that annotate each of the content items in the data set. The system receives a new data set with the content items each including a relevancy annotation. Based on the relevancy annotations in the new data the system determines what additional processing to perform.

The examples and appended claims may serve as a summary of this application.

BRIEF DESCRIPTION OF THE DRAWINGS

The present invention relates generally to content generation, and more particularly, to systems and methods for providing rich media presentation of recommendations in generative media.

The present disclosure will become better understood from the detailed description and the drawings, wherein.

DETAILED DESCRIPTION

Figure 1A:
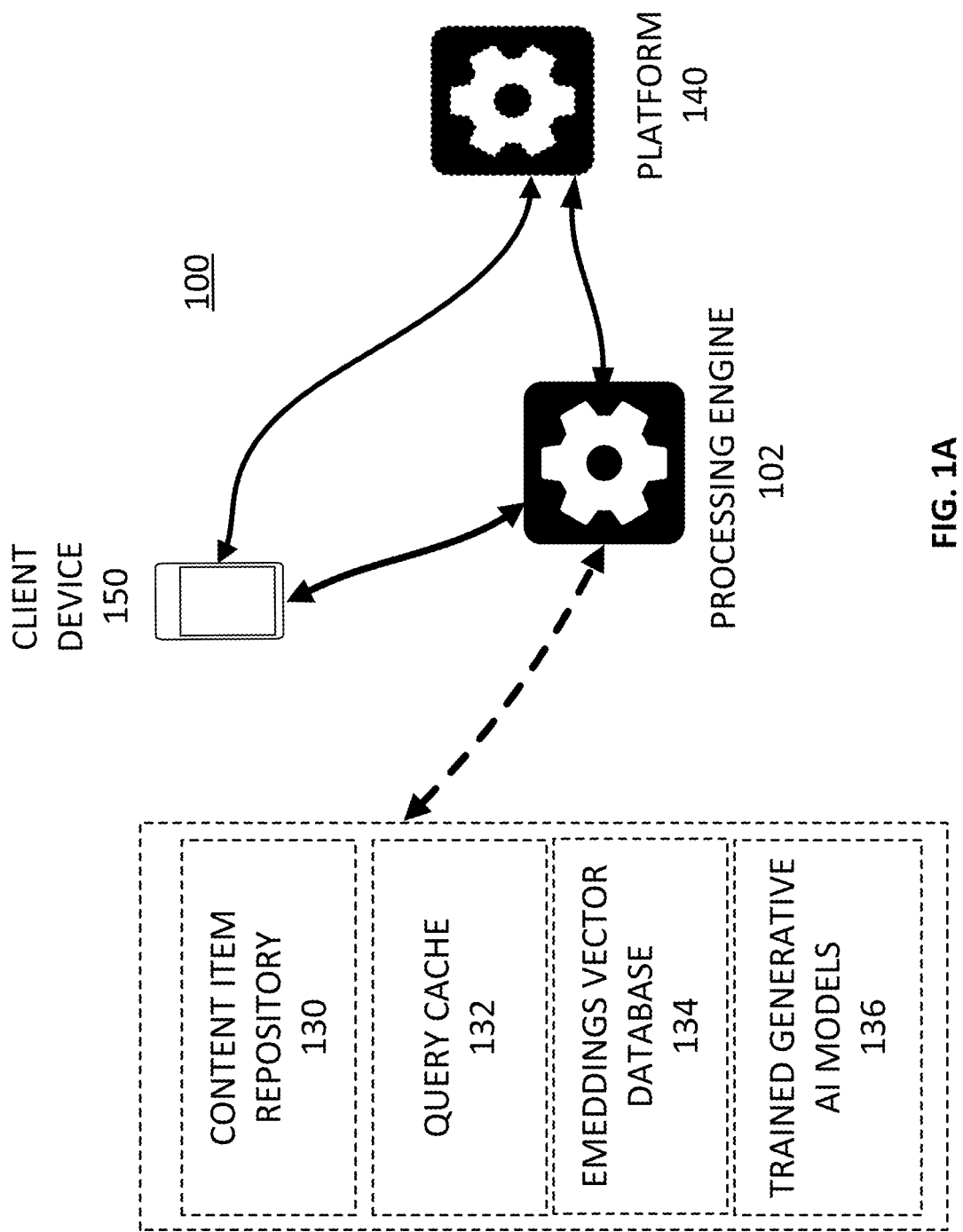
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a content item repository 130, a query cache 132, embeddings vector database 134, and trained generative AI models 136, such as one or more foundation generative AI models and domain refined generative AI models. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally. In some embodiments, the embeddings vector database 134 includes at least one or more of the following: query embeddings which are historic embeddings associated with a prior user query; vector embeddings generated by the trained generative AI models; real product item listing embeddings; real document embeddings. Each of the embeddings in Vector database 134 may have an embedding type such as an image, text, multiple, etc.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

In an embodiment, the processing engine 102 may perform the method 500 (see FIG. 5) or other method herein and, as a result, provide for rich media presentation of recommendations in generative media. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, user interface processing tasks, while other processing tasks are performed remotely via one or more connected servers, such as, media or content search and retrieval tasks. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the platform 140, processing engine 102, and client device 150 may be the same device. In some embodiments, the platform 140 and/or the client device 150 are associated with one or more particular user accounts.

Figure 1B:
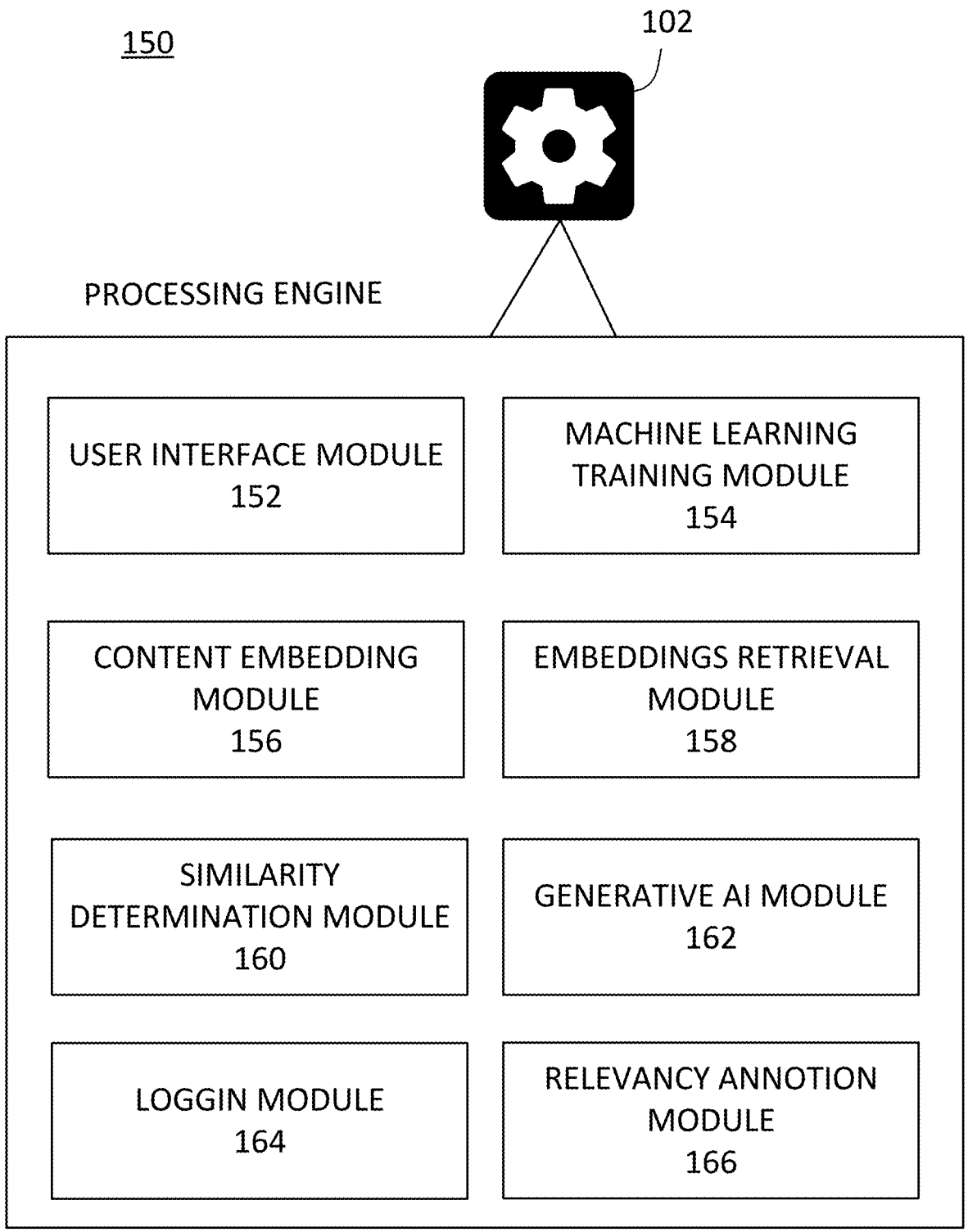
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to receive a user input of a search query and display the results of the search query via a user interface of the client device.

The machine learning training module 154 functions to train one mor more machine learning models of the search and retrieval system.

The content embedding module 156 obtains information about real listing of items, such as images, text and/or multimedia, and generates embeddings and stores the information in a vector database.

The embeddings retrieval module 158 obtains embedding information based on an identifier, such as an item identifier, a user identifier, a query identifier or a combination thereof.

The similarity determination module 160 determines a similarity and generates a similarity score based on a type and an identifier. The system searches a vector database that has stored embedding information related to text, images and multimedia. The module determines similarity of one or more embeddings of the content item listings generated from the one or more generative AI models with one or more embeddings for real product items, real documents or other embeddings stored in the vector database.

The generative AI module 162 receives a search query via a prompter to perform a search via one or more generative AI models. The generative AI models may include a primary general generative AI model and one or more domain specific generative AI models.

The logging module 164 generates one or more logs of describing content items returned relevant to a search query.

The relevancy annotation module 166 performs relevancy annotation using one or more LLMs.

Figure 2A:
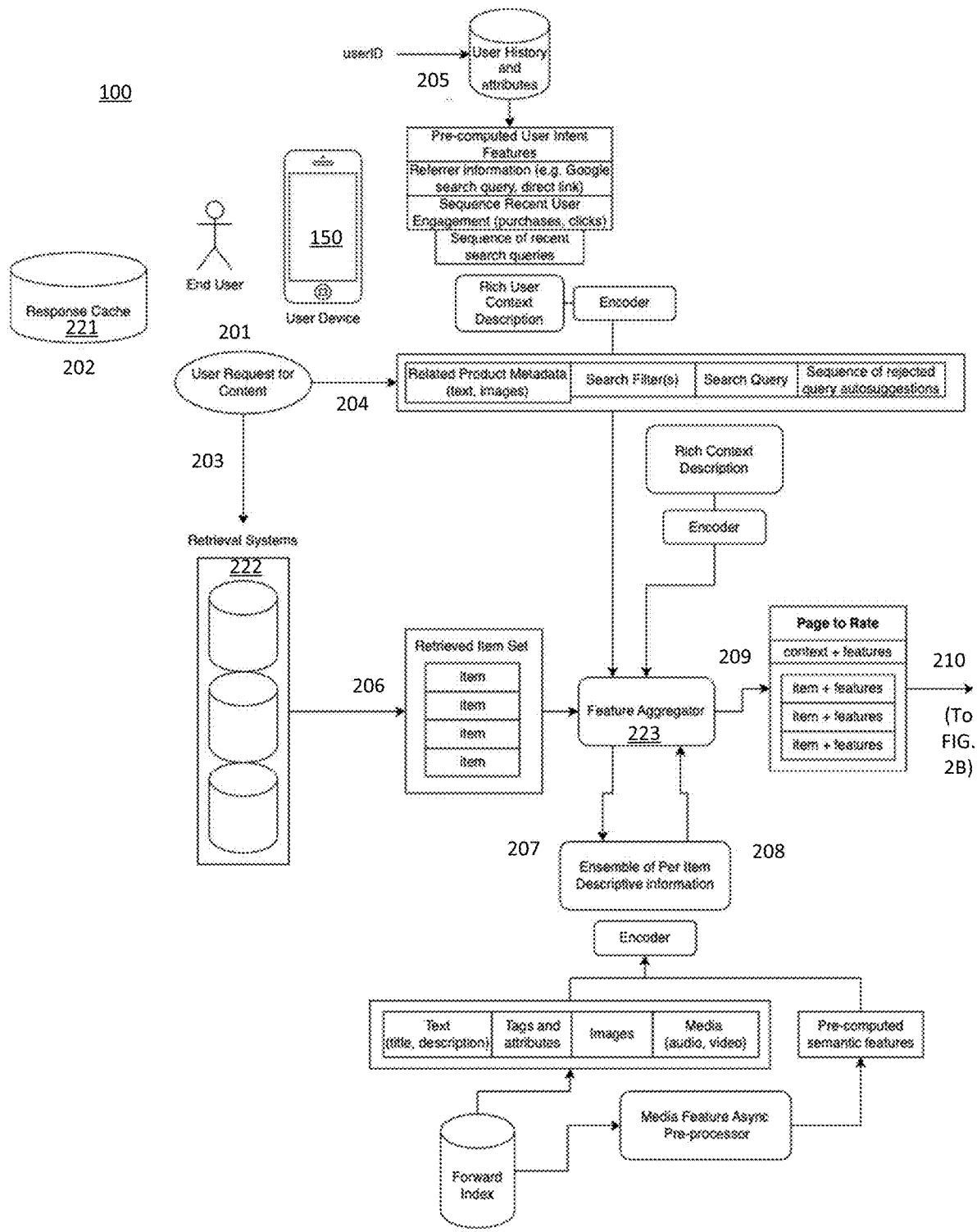
FIGS. 2A-2B is a diagram illustrating an exemplary method according to an embodiment.
Figure 2B:
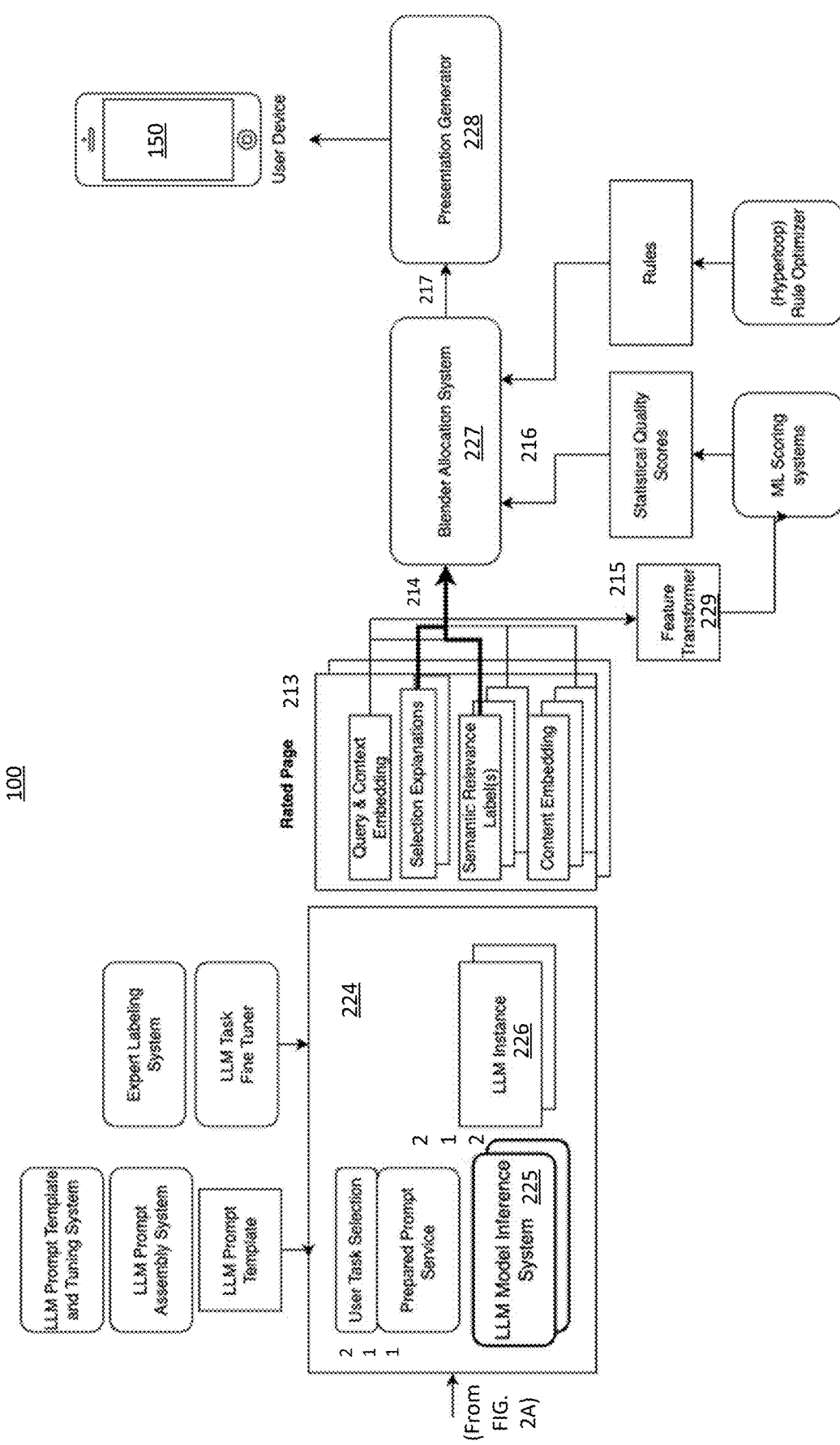

FIGS. 2A-2B is a diagram illustrating an exemplary system and method 200 according to an embodiment.

In step 201, the system receives, via user interface displayed on a user device 150 (e.g. a web browser, mobile device, or other content display systems), an end user request for a search, ad, feed, recommendation, or some other request to present optimized content.

In step 202, the system may determine a response to the end user request by evaluating a response cache 221 that may have stored historical responses to a similar requests by the end user or other end users. In some embodiments, the system may use response cache 221 to bypass all or parts of this system to return a pre-computed response in part or in whole for display to the user via the device.

In step 203, the end user request for content is passed to a retrieval system 222 to fetch potentially eligible contents for consideration for display via the user device. In some embodiments, the retrieval system 222 is implemented as a pool of systems including databases, datastores, keyword retrieval, and vector retrieval systems. Contextual information like a search query, user preferences, categories, or a high-level attribute like "top," "new," or "promoted," plus any filters or constraints, are passed to retrieval systems as an inputs. The union of the responses of the retrieval systems is further described in step 206.

In step 204, contemporaneously and/or in parallel to the retrieval of content form the retrieval system 222 (or afterwards if using fully isolated a second stage ranking architecture), the system processes the contextual information that may also be used as inputs to the retrieval sub-system into features for inputs into statistical learning and prompt generation. The system 100 provides these features to a feature aggregator engine 223.

In step 205, contemporaneously and/or in parallel to steps 203 and 204, the system 100 (similar to the fetching and processing of context features) fetches and processes user features such as recent or past activity history, preferences, past search queries, and other pre-computed user features. The system 100 provides this information to the feature aggregator engine 223.

In step 206, a set of items are returned from the retrieval sub-system and sent to the feature aggregator engine 223 to be annotated with additional item features and processing.

In step 207, the system 100 send identifiers of all items in the set to an item feature store for features.

In step 208, the item feature store returns a rich set of contextual features about what each content is like text and attributes and potentially other rich media including pre-processed features like embeddings, annotations, and other methods for more efficiently representing rich media for use in downstream AI and ML applications. In some embodiments, the item feature store may include contextual awareness and, additionally provides per-item pre-computed contextual or user relevancy annotations.

In step 209, the feature aggregator engine 223 generates a Page to Rate data set which includes the context and user information and the set of items with their features to be annotated by the LLM and ultimately be candidates for presentation by the allocation system.

In step 210, the Page to Rate data set is presented in whole (an entire page) or in parts (as pairs of context and item, as the context first and then batches of items, or as multiple pages of subset of items from the Page to Rate, potentially for efficiency, or due to system limits, to the LLM ensemble system 224 for annotations.

In step 211, the LLM ensemble system 224, outside of the live inference for annotation, uses prompt tuning, assembly, and inference optimization and supervised domain task refinement techniques for better focusing the LLMs to the domain specific task of relevance annotation with more accuracy and to use fewer resources. These systems produce LLM weights as LLM binary Instances to be executed by the LLM model inference system 225.

In step 211, the LLM ensemble system 224 uses one or multiple LLMs 226 to annotate the Page to Rate data set by generating a response of structured content. Depending on the available context information, and a different prompt to the LLM 26 may be selected, and/or the prompt to the LLM 226 may include conditional execution logic for different contextual situations.

For example, a product may have different surfaces, like home page, personalized recommendations, search, and related products. The LLM relevance annotation instructions, or the LLM itself may be different depending on what type of page is viewed. Another example is when the provided query is irrelevant to the domain as determined by the LLM or another statistical classifier. In that case, item relevance annotations are undefined, and the LLM task of annotation is aborted. Another example is when nearly all items already have cached relevance annotations. In that case, if no additional contextual information is provided, then the LLM task may be superfluous and annotation may not occur, bypassing the LLM. However, if the LLM detects substantial user activity and contextual hints that the common case relevancy is insufficiently satisfying to the end user, for example, repeated recent and similar search queries without successful engagement evidence in the recent user activity history, then LLM will execute new relevance annotations using the additional context as additional information.

If the item type supports this (e.g., clothing catalog), the LLM prompt can select "relevant variant" tags to be passed to the presentation layer. For example, for a clothing e-commerce retailer, the LLM prompt could include instructions like:
  If the query includes a product variant attribute specification like color, brand, identity, and that variant attribute is included as an attribute in the item description and attributes, then attach a variant tag relevance attribute of that match to the item.
  If the user history indicates a preference for sizes, gender identity, or colors, then attach a variant tag relevance attribute of that match to the item.

When such a relevance attribute annotation is attached to an item by the LLM, the system 100 passes the relevance annotation through the blender allocation system 227 and the presentation generator 228 so that it can be used by the UX system in the user device 150 to show that variant to the end user. For example, if the user search for "red dress" on an e-commerce site, and a dress is returned that comes in many colors including red, then the LLM annotation system will attach a relevance annotation "{" color ": "red"}" to the item and give it a high relevance score. If the user later selects a search filter for size "XS," and reissues the request, then attach {"size": "XS"} as a relevance annotation. When the user visits the home page and general recommendations appear, the LLM task switches to user-history relevance, prioritizes annotation of items that are {"size": "XS"} attribute, and attaches this relevance annotation for display that size preference to the end user.

In step 213, the resulting generations from the LLMs, the Rated Page data set, include multiple facets including query and content embeddings, selection explanations, semantic relevance labels (which may be statistical aggregates of multiple labels including mean and variance or of multiple aspects of relevance like to-query versus to-user), and content embeddings (if not already pre-generated in a previous step).

In step 214, the resulting generations are parsed by the system into data structures appropriate for blending and allocation decisioning in the blender allocation system 227. For example, irrelevant items may be excluded from allocation. In some embodiments, the system allocates highly relevant items first.

In step 215, depending on the configuration, features derived from the Rated Page data set are sent to a feature transformer system 229 to transform them into appropriate formats for ML statistical inference systems (e.g., pairs of embeddings are used to compute similarity scores and distribution features of such. Textual data are broken into words and one-hot-encoded. Ordinal's rankings returned as text are converted into numerical formats).

In step 216, these statistical inferences (which may use the Rate Page data set features derived from LLM outputs) are also passed by the system 100 to the blender allocation system 227 for use in generating an ideal allocation.

In step 217, the blender allocation system 227 generates the final optimized allocation of contents based on all inputs, including optimized allocation rules, to the presentation generator system 228 that returns an appropriately formatted response to a user interface displayed on the user device 150.

In some embodiments, the presentation of the formatted response via the user interface, may include the items to present from the original retrieval response. It may further include annotations on items to improve their relevant presentation to the end user. For example, as noted in step 212, the LLM prompt can be made aware of item variants, and relevancy annotation to the query or user can be conditional on that item variant being shown to the user (e.g., the "red" image of a dress available in "red" when "red dress" is searched."). In another example, relevance explanation annotations may be text or rendered to the user interface with visual annotations, such as tags or icons.

Depending on the relevancy annotation of the query and context to the domain as determined by the LLM relevancy annotation, the allocation logic can change. For example, if contextual relevance is determined to be "broad" or "not domain applicable," then the use of the relevance annotation in allocation decisions can be relaxed or removed. Likewise, if the contextual relevance is determined to be "specific intent," then only highly-contextual relevant items will be allocated first, then followed by moderately contextual relevant results, with results allocated by potentially other considerations like estimated profitability subject to these relevancy stratifications.

In some embodiments, the presentation processing can change depending on the results returned by the Blender Allocation System. For example, if contextual relevance is determined to be domain appropriate, and there are no relevant items, then the system will return to the user that there are no relevant results (versus an ordering of many irrelevant results). The system can further determine to issue a more general query for additional contents based on similar common queries (as determined by the LLM or business rules), contents recommended to the user relevant to their browsing history in an additional request with a new context based on the user relevancy, or a default "top popular items" response, or a blend of these.

Figure 3:
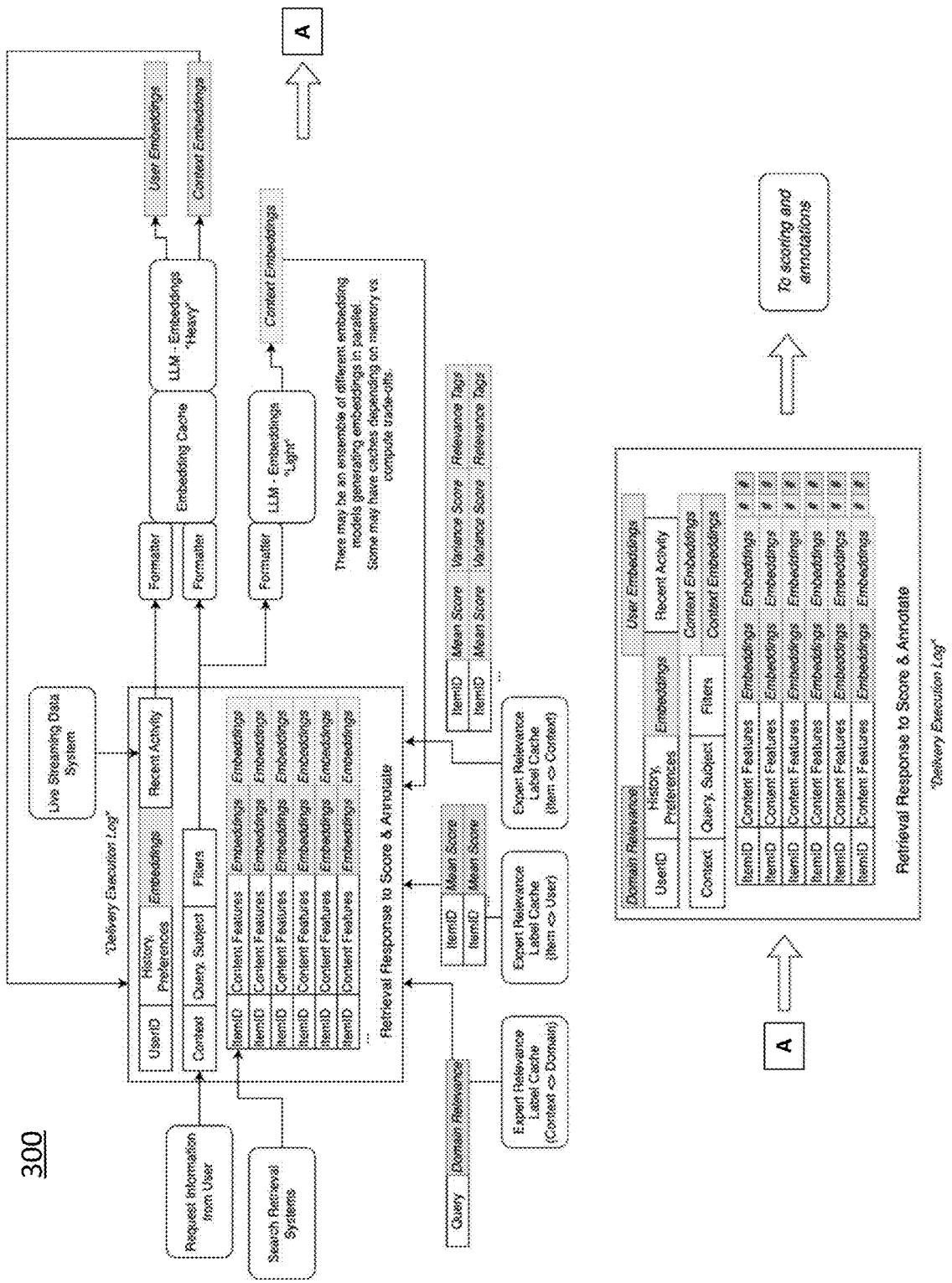
FIG. 3 is a diagram illustrating an exemplary method 300 according to an embodiment.

FIG. 3 is a diagram illustrating an exemplary method 300 according to an embodiment.

In some embodiments, the system 100 generates an ensemble of content embeddings and semantic annotations when some of these embeddings and annotations have been pre-generated and cached. Generating new, un-cached embeddings may happen prior to the full LLM annotation generation step as in this "Embedding+Cache," or some embedding generation may happen implicitly as a subprocess step of the full LLM annotation depending on the LLM architecture. Many LLMs also accept compatible content embeddings as inputs in addition to or in place of the original text, images, and other media used to generate these embeddings.

This diagram emphasizes that contents have multiple types of embeddings generated from different embedding models, here represented by different shadings. Because items are known in advance, embeddings derived from content items are typically pre-computed and cached versus computed during fulfillment of a live user request. Common, repeated queries known users with established histories may also have existing cached embeddings.

However, embeddings for the context including unique or rare queries, search filter and refinements, and combinations of these are not cached because they may be unique or there are too many of them to be pre-computed. These embeddings must be computed in live production during fulfillment of the user query and to create the response. It's important that there are matching embeddings for contexts, users, and items to use ML and other statistical techniques to estimate relevancy by embedding similarity as these are typically computed as similarity scores using dot products or more complex embedding comparison methods that may be trained using supervised classification methods like neural network weights.

For example, there may be a precomputed query embedding for "red dress" but not "red dresses with v-necks" with the search filters "Size: XS, color: red." The latter would need to be computed live.

When computing query, context, and user embeddings, a "light" version of prompt engineering applies (as noted in the "Formatter" component in the diagram.) Depending on the domain, the query or context may first be "cleaned" to be plain text with extraneous formatting and characters removed or replaced depending on the type of the embedding model used. Then, by experimentation and refined by supervised expert evaluation loops or relevancy model classification feature selection methods like GBDT where an LLM semantic relevance annotation label is predicted from an ensemble of embedding similarity scores, a "template" may be applied to the query prior to embedding to improve resulting relevancy judgement quality. For example, for a job listing marketplace, the prompt "focus: X" is used in the embedding where "X" is the cleaned user query.

Relevance Annotations

In some embodiments, the system 100 may generate a relevance annotation based on different categories or relevance ordering. For example, the system 100 may use an ordinal scale(s) (domain specific and customized to one or many rubrics). The system 100 may use a domain labeling category for interpretation of words when words are ambiguous. The system may use a defenses category which explains why a particular annotation was made and provide the explanation in text or other generated media. The system 100 may use a pitches category provides a description of (e.g., selling me) on why the annotation is relevant in a context.

Order of Inference Execution and Caching Considerations

In some processing situations, if end user latency and inference compute costs are of no consideration, then in one mode of operation, the system (1) computes all LLM outputs including embeddings and annotations, (2) computes all statistical inferences like click predictions using outputs from (1) as input features, (3) and computes the ideal allocation given results from (1) and (2). However, when both latency and computed costs are limited and sufficient memory is available, then the system 100 for the computations of (1) and (2) may use a cache that saves previous computations. Caching can work for the most seen query and item pairs and when these pairs are stable. In some situation, caching may not work when there are too many (over hundreds of millions) of pairs, or for unique or nearly unique queries. Caching may also be ineffective when there are many new items regularly created. To limit end user latencies, some processing for (1) and (2) can be computed in parallel rather than in sequence so that the total end user latency is reduced. Computing embeddings using LLMs is much faster than computing generated annotations, and the embeddings alone may contain most of the relevancy signal useful for statistical inference. Therefore, the processing can be adjusted to start relevance annotations in parallel to computing embeddings. If the embeddings return first, then the processing may proceed to statistical inference using the embedding-derived features while relevance annotations with the LLM continue to compute. The processing proceeds to the allocation step once both statistical inference and relevance annotations complete. Furthermore, if using more extensive generation, like plain text "relevance defenses" or "sales pitches," these generations may not be significantly useful to statistical inference and may not affect the allocation decision. Therefore, these responses may be computed as a parallel asynchronous process starting at (1) and in parallel to scoring (2) and even allocation (3) and be returned to the user presentation system later. If these annotations return much later, such that the allocated contents have already been presented to the user, then they may go to a cache or awaiting update hook where the user device in (1) can later fetch this content and display the annotations as a second step. For example, the plain text relevance annotations can fade in on the content display title or in a user interface response to user engagement like a click.

Computer Process Execution Based on LLM Relevancy Annotation

In some embodiments, the system 100 uses of the LLM relevancy annotation outputs for different system execution for processing. For example, the system 100 may determine and perform one or modules, functions and/or computer processing operations of the system, based on the relevancy annotation outputs generated by the one or more LLMs. For example, the system may perform statistical learning (e.g., pCTR) operation, blending operations, annotation presentation, via a user interface, based on the annotations and/or logging operations that stores data related to the relevancy annotations.

Example Rating Template and Prompts

The system may generate one or more prompts in determining relevancy annotations. The following are examples of a prompt and relevancy ranking scoring that may be used by an LLM to determine relevancy annotations.

Example Rating Template:
QUERY_TASK_PROMPTS=[
""""Focus: {query}"""",
""""\"{query}\"""",]
QUERY_TASK_PROMPTS_NAMES=["raw", "focus_prompt", "quoted"]
QUERY_RATING_TEMPLATE_SYS=""""I am a hiring manager evaluating freelancer profiles on Upwork.com to find the best freelancer to hire for my job using a specific query. Your task is to use the Profile Relevance Scale (1-5) described below to rate how well a freelancer profile matches my query by how likely a hiring manager would hire a freelancer with this profile given this query. Be skeptical and selective. Adjust your ratings to reflect both the profile topical relevance to the query and any specified level of specific experience, expertise, or level. Be especially critical of skill keywords that seem to inflate a freelancer's topical relevance without sufficient evidence throughout the profile to support these claims. Consider whether the freelancer's hourly rate in USD aligns with the expertise claimed in the profile, as discrepancies may indicate exaggeration. For a 4 or 5 rating, the primary focus of the profile must match the query.

Profile Relevance Scale (1-5):

1) Irrelevant: No connection or relevance; likely a mismatch, dishonest representation, or an error. A hiring manager seeing this profile for this query would think that search is broken or obviously wrong. The profile must have no topical relevance to the query for a 1 rating. Even a tiny amount of general topical relevance must be a higher 2 rating. If you are unsure between a 1 or 2 rating, then assign a 2 rating. It must be impossible for this freelancer to ever complete a job implied by this query for a 1 rating. Never assign a 1 rating if it's possible that this freelancer could ever complete a job implied by the query even if information is missing from the profile. A missing title or description is always a 1.

2) Slightly Relevant: Minimal connection. Profile claims may not be supported by the profile's overall content or might be inconsistent with the expertise level suggested by the hourly rate. The freelancer profile touches on the query topic but only in passing or as a minor point within a largely unrelated context. This freelancer profile is highly unlikely to be hired by this hiring manager for this query. A rating of 2 has some topical relevance to the query that a hiring manager using this query would probably recognize. Even a tiny amount of general topical relevance is a 2 rating, not a 1 rating. If you are unsure between a 1 or 2 rating, assign a 2 rating.

3) Moderately Relevant: A broad match, but not a good match. Does not match the profile's primary focus. Or, matches a profile's implied primary focus, but critical analysis raises significant doubts about the depth or authenticity of the expertise claimed. Or, specific details in the query do not match the profile, like experience level, specific job functions and skills, and past experiences. The profile may be excellent in general but not a good fit for this query specifically for a 3 rating. If this freelancer was hired by this hiring manager for this query, it implies that this freelancer has other relevant skills and experience implied by but missing from this profile. Or, this freelancer is too senior and specialized or too junior and inexperienced for the job implied by the query.

4) Highly Relevant: A good match with substantial related information; however, inconsistencies, incomplete information, or a lack of supporting details require a cautious approach to fully endorsing the expertise level claimed or a perfect match with the query. This query must highly match a profile's primary focus and implied experience level and specialty to be at least a 4 rating. Otherwise, award a lower 3 rating.

5) Exactly Relevant: A perfect match. Clear, consistent evidence throughout the profile supports the expertise claimed and the hourly rate is reasonable for the professional level expected for such skills and not too low. Ideally, the profile title and first sentences of the description emphasize this profile's topical relevance with the query in all important aspects. The query exactly matches the primary focus of the profile and the expectations of a hiring manager who would search for this query. The profile is well-written and detailed with substantial supporting evidence and descriptions. A hiring manager would surely be delighted to hire this freelancer profile for this query. When in doubt, assign a more conservative 4 rating. A profile of only a few sentences is not enough information for a 5 rating. If a country is mentioned in the query, then it must be included in the profile for a 5 rating.

QUERY_RATING_RATE_ONLY_SYS=""""Only respond with a profile relevance rating 1 to 5.""""

QUERY_RATING_EXPLAIN_SYS="""Respond with a rating, and then explain why you chose that rating, including any skepticism about the claims made in the freelancer's profile. Respond in JSON format, for example:
{"Profile_Relevance_Rating": #,
"Profile_Relevance_Rating_Explanation": [put the explanation here]}"""
QUERY_RATING_EXPLAIN_SYS="""Respond with a rating, and then explain why you chose that rating, including any skepticism about the claims made in the freelancer's profile. Respond in JSON format, for example:
{"Profile_Relevance_Rating": #,
"Profile_Relevance_Rating_Explanation": [put the explanation here]}"""

Figure 4:
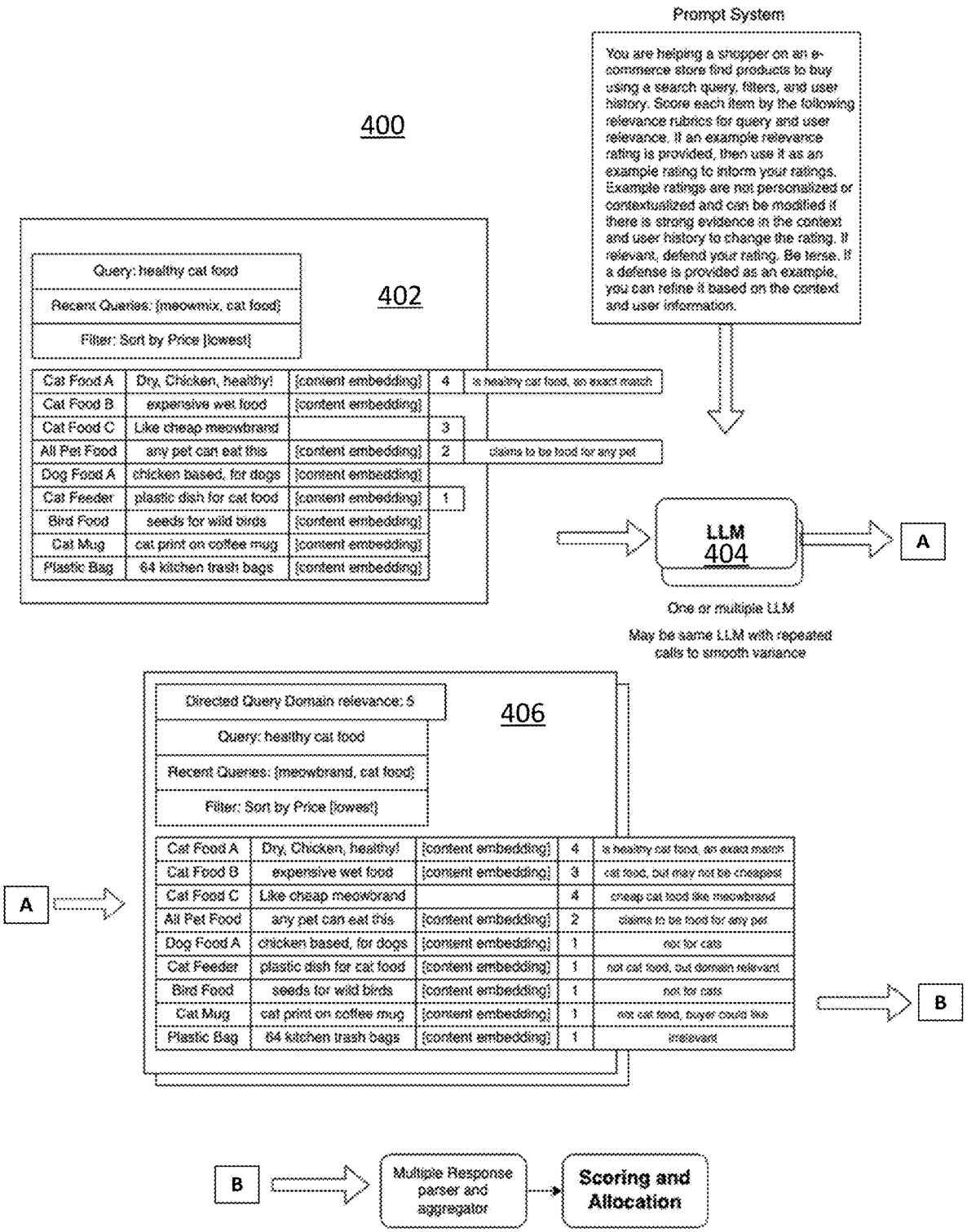
FIG. 4 is a diagram illustrating an exemplary relevancy annotation using one or more LLMs.

FIG. 4 is a diagram illustrating an exemplary process flow 400 for relevancy annotation using one or more LLMs. The diagram shows initial retrieved and annotated data 402 related to a query related to a search for healthy cat food. Other recent queries the system has received relate to cat food products by brand. A filter is applied to the query request to sort product by its lowest prices. As shown, the initial resulting data obtained by the system through the pre-LLM relevancy annotation, provides a listing of items of different product types, such as Cat Food A, Cat Food B, Cat Food C, etc. In this data set, the items may or may not have assigned an initial relevancy label. For example, the item Cat Food A is labeled with the number 4, Cat Food B has not label, and Cat Food C has a label of 3.

The system generates a prompt instructing one or more LLMs 404 to generate and annotate relevancy labels for the content item of the data items of the annotated data 402. A prompt and the annotated data are provided are provided to one or more LLMs. The one or more LLMs 404 generates an updated set of annotated data 406 where the data times include an updated relevancy annotation. For example, Cat Food A has a number 4 associated with the item (which did not change from the initial annotated data 402), Cat Food B now has a number 3 associated with the item, Cat Food 4 has a number 4 associated with the item. The remaining items also have an annotated relevancy label.

Moreover, the updated annotated data 406 may include a reasoning descriptor associated with the relevancy annotation. For example, the prompt may instruct the one or more LLMs 404 to describe or explain the reasoning of why a particular relevancy annotation was made. For example, the LLM 404 for the item Cat Food B for an annotation of 3, generated a description of "cat food, buy may not be cheapest". For the item Cat Food C for an annotation of 4, the LLM generated a description of "cheap cat food like meowbrand".

Figure 5:
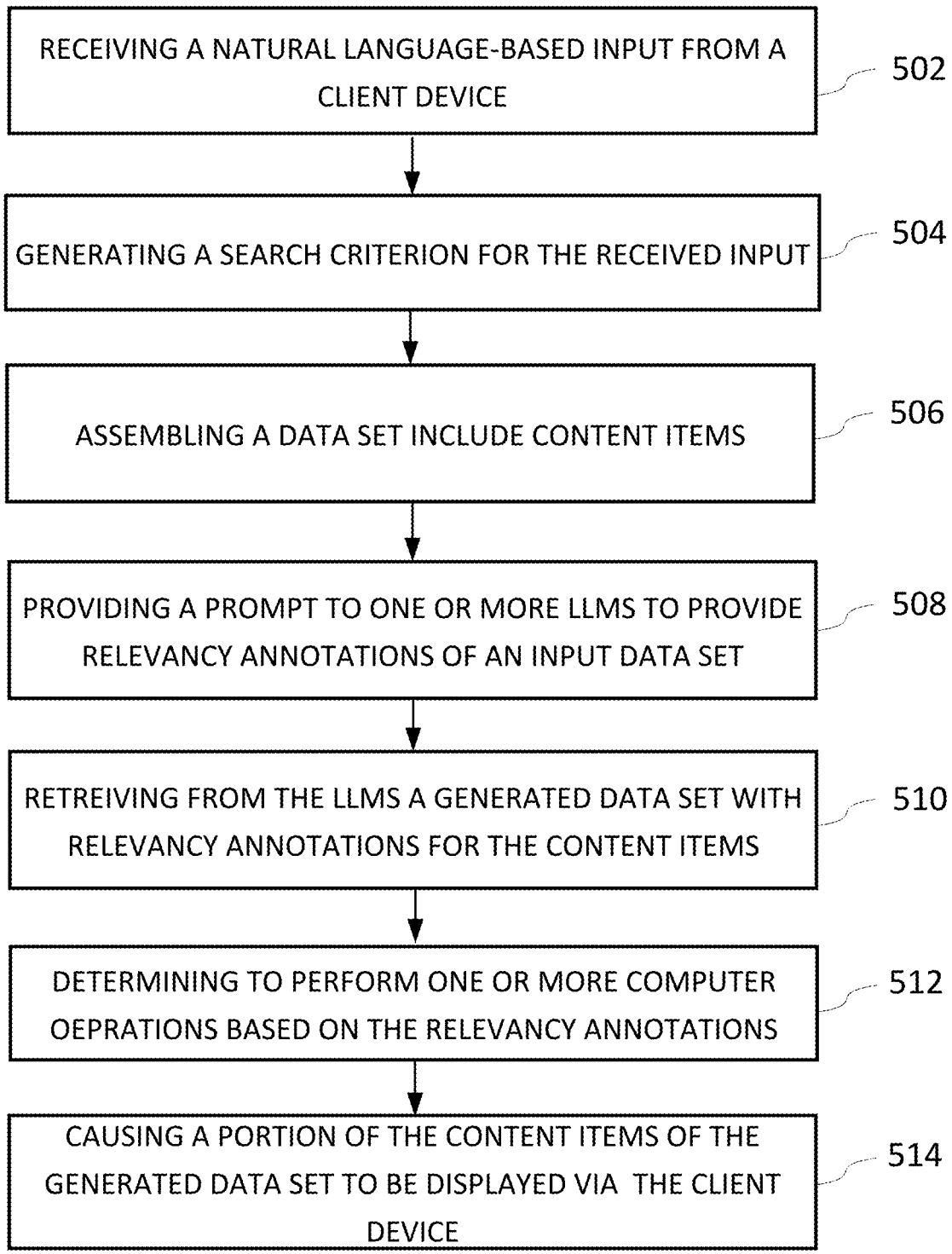
FIG. 5 is a flow chart illustrating an exemplary method that may be performed in some embodiments.

FIG. 5 is a flow chart illustrating an exemplary method 500 that may be performed in some embodiments. The performance of the operations by the system 100 regarding relevancy annotation are further described with reference to the method 500.

In step 502, the system receives a natural language-based input from a client device. For example, a user may enter search criteria for a query into a user interface via a client device.

In step 504, the system generates a search criterion for the received input. The system generated search criteria for the input user search.

In step 506, the system assembles a data set using one or more retrieval system and data assembly system to obtain data and create an initial data set listing content items that are responsive to the user search.

In step 508, the system provides a prompt to one or more large language models (LLMs) instructing the LLMs to generate an output dataset with relevancy annotations for content items. The content items of the data set are provided to the LLMs. The system causes the LLMs to execute the prompt with the input data set.

In step 510, the system retrieves from the LLMs a generated data set with relevancy annotations associated to each of the content items in the initial data set.

In step 512, the system determines one or more computer operations to perform based on the relevancy annotations of the generated content items.

In some modes of operation, the system 100 determines one or more action to be performed by the system based on the values of the annotated relevancy labels. For examples, the system evaluates the values of the relevancy labels and may perform one or more of the following: (1) continue processing to a blender operation and presentation of the content items to the user interface; (2) resubmit the assembled data set from step 506 back to the one or more LLMs via step 508 for another annotated relevancy labeling to generate a new data set with relevancy annotations for content items; (3) submit the generated data set from step 510 back into the LLM via step 508 to generate another data set with relevancy annotations for content items; and (4) determine a lack of relevancy and generate a message for display to a user that no relevant items were found.

In one example, the system includes a relevancy review engine that reviews the relevancy annotations added to the generated data set in step 510. The relevancy review engine may determine whether each of the content items include a relevancy annotation. If so, then the system 100 may cause further operations of the system to be performed, such as displaying, via a user interface at least a portion of the content items in an order based on the relevancy annotations in the generated data set.

In another example, the system includes a relevancy review engine that reviews the relevancy annotations added to the generated data set in step 510. The system may set a threshold value of scores that the individual or group of items must meet. For example, if the content items are annotated on an ordinal scale of 1-5, then the system may include a minimum number of items (e.g., 5 items) that meet a score of 4. If the minimum number of items do not meet the relevancy annotation of 4, then the system may determine to perform computer operations to resubmit the assembled data from step 506 back to the one or more LLMs via step 508 to generate another data set with new relevancy annotations for content items. Moreover, the system 100 may select a different LLM to use to generate new relevancy annotations than the LLM original used in original step 508. Rerunning the step 508 with the original LLM or a new LLM may generate a new data that has relevancy annotations that are different than the original relevancy annotations. The system may repeat this process for an predetermined number of times until the generated data set from step 510 includes the minimum number of items that meet the predetermined relevancy score for the content items.

In another example, the system includes a relevancy review engine that reviews the relevancy annotations added to the generated data set in step 510. The system may set a threshold value of scores that the individual or group of items must meet. For example, if the content items are annotated on an ordinal scale of 1-5, then the system may include a minimum number of items (e.g., 5 items) that meet a score of 4. If the minimum number of items do not meet the relevancy annotation of 4, then the system may determine to perform computer operations to submit the generated data from step 510 back to the one or more LLMs via step 508 to generate another data set with new relevancy annotations for content items. Moreover, the system 100 may select a different LLM to use to generate new relevancy annotations than the LLM original used in original step 508. Here the system is using the data set with LLM relevancy annotations to generate a new data that has possible different relevancy annotations that are different than the original generated data set form step 510.

In another example, the system includes a relevancy review engine that review the generated data set from step 510. The system may determine whether any of the items or a minimum number of items meet or exceed a predetermined threshold value. If no, then the system may determine not to present any of the content items via the user interface. The system may optionally generate a message that no relevant content items were found responsive to the user query.

In step 514, the system causes a portion of the content items of the generated data set to be displayed via a user interface of the client device.

Figure 6:
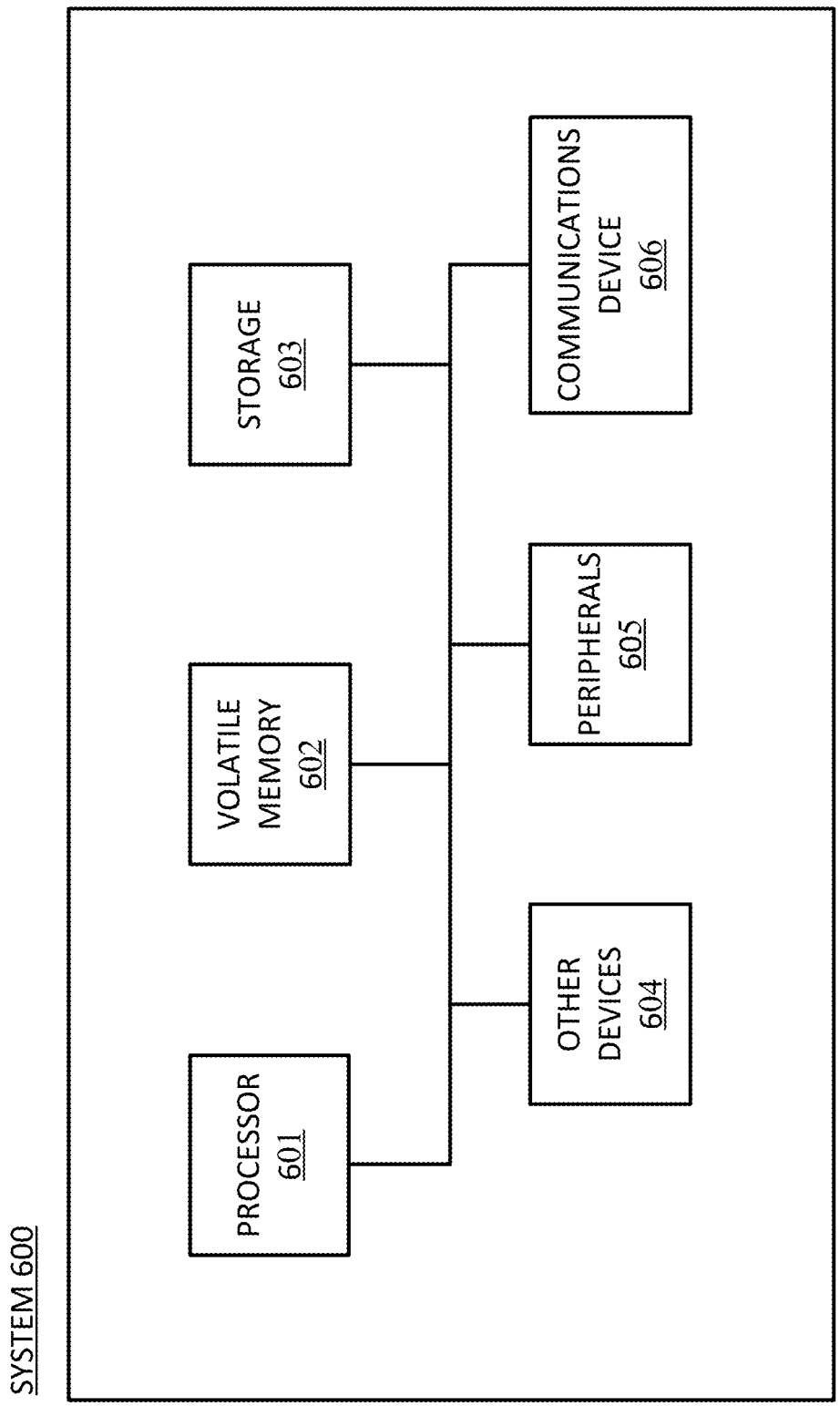
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 600 to an external medium. For example, communications device 606 may take the form of a network adapter that provides communications to a network. A computer 600 may also include a variety of other devices 804. The various components of the computer 600 may be connected by a connection medium such as a bus, crossbar, or network.

Example set. It will be appreciated that the present disclosure may include any one and up to all of the following examples:

Example 1. A computer-implemented method performed by one or more processors, comprising the operations of: receiving a natural language-based input associated with a client device; generating, by the one or more processors, a search criterion for the received natural language-based input; assembling, by the one or more processors, a first data set including a description of content items; providing a prompt to one or more large language models (LLMs), instructions to generate a relevancy annotation to the content items; providing as an input to the LLMs at least a portion of the data set of content items; executing of the LLM to process the first prompt with the provided input; receiving, as an output from the LLMs, a first generated data set including a description of the content items where the content items have an association relevancy annotation for the content item; and determining, by the one or more processors, an operation to be performed based on the relevancy annotations of the generated data set.

Example 2. The computer-implemented method of Example 1, further comprising the operations of: wherein the determined operation is to further perform processing of the generated data set; and causing a portion of the list of content items to be displayed via a user interface at the client device.

Example 3. The computer-implemented of any one of Examples 1-2, further comprising the operations of: wherein the determined operation is to further perform processing of the generated data set; and providing a second prompt to the LLMs instructions to generate a relevancy annotation to the content items of the first data set; providing as a second input to the LLMs at least a portion of the data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 4. The computer-implemented of any one of Examples 1-3, further comprising the operations of: wherein the determined operation is to further perform processing of the generated data set; and providing a second prompt to the LLMs instructions to generate a relevancy annotation to the content items of the first generated data set; providing as a second input to the LLMs at least a portion of the first generated data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 5. The computer-implemented of any one of Examples 1-4, further comprising the operations of: wherein the determined operation is to generate a message for display to a user interface that no relevant items were found.

Example 6. The computer-implemented of any one of Examples 1-5, further comprising the operations of: wherein the LLMs generate a relevancy annotation based on a numeric scale indicating a relevancy of a content item according to search criterion and description of the content items in the first data set.

Example 7. The computer-implemented of any one of Examples 1-6, further comprising the operations of: wherein the LLMs generate a textual reason and/or description of why or how a respective content item of the first generated data set was given a relevancy annotation value.

Example 8. A system comprising one or more processors configured to perform the operations of: receiving a natural language-based input associated with a client device; generating, by the one or more processors, a search criterion for the received natural language-based input; assembling, by the one or more processors, a first data set including a description of content items; providing a prompt to one or more large language models (LLMs), instructions to generate a relevancy annotation to the content items; providing as an input to the LLMs at least a portion of the data set of content items; executing of the LLM to process the first prompt with the provided input; receiving, as an output from the LLMs, a first generated data set including a description of the content items where the content items have an association relevancy annotation for the content item; and determining, by the one or more processors, an operation to be performed based on the relevancy annotations of the generated data set.

Example 9. The system of Example 8, further comprising the operations of: wherein the determined operation is to further perform processing of the generated data set; and causing a portion of the list of content items to be displayed via a user interface at the client device.

Example 10. The system of any one of Examples 8-9, further comprising the operations of: wherein the determined operation is to further perform processing of the generated data set; and providing a second prompt to the LLMs instructions to generate a relevancy annotation to the content items of the first data set; providing as a second input to the LLMs at least a portion of the data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 11. The system of any one of Examples 8-10, further comprising the operations of: wherein the determined operation is to further perform processing of the generated data set; and providing a second prompt to the LLMs instructions to generate a relevancy annotation to the content items of the first generated data set; providing as a second input to the LLMs at least a portion of the first generated data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 12. The system of any one of Examples 8-11, further comprising the operations of: wherein the determined operation is to generate a message for display to a user interface that no relevant items were found.

Example 13. The system of any one of Examples 8-12, further comprising the operations of: wherein the LLMs generate a relevancy annotation based on a numeric scale indicating a relevancy of a content item according to search criterion and description of the content items in the first data set.

Example 14. The system of any one of Examples 8-13, further comprising the operations of: wherein the LLMs generate a textual reason and/or description of why or how a respective content item of the first generated data set was given a relevancy annotation value.

Example 15. A non-transitory computer readable medium storing a software program comprising data and computer implementable instructions that when executed by at least one processor cause the at least one processor to perform operations: receiving a natural language-based input associated with a client device; generating, by the one or more processors, a search criterion for the received natural language-based input; assembling, by the one or more processors, a first data set including a description of content items; providing a prompt to one or more large language models (LLMs), instructions to generate a relevancy annotation to the content items; providing as an input to the LLMs at least a portion of the data set of content items; executing of the LLMs to process the first prompt with the provided input; receiving, as an output from the LLMs, a first generated data set including a description of the content items where the content items have an association relevancy annotation for the content item; and determining, by the one or more processors, an operation to be performed based on the relevancy annotations of the generated data set.

Example 16. The non-transitory computer readable medium of Example 15, further comprising the operations of: wherein the determined operation is to further perform processing of the generated data set; and causing a portion of the list of content items to be displayed via a user interface at the client device.

Example 17. The non-transitory computer readable medium of any one of Examples 15-16, further comprising the operations of: wherein the determined operation is to further perform processing of the generated data set; and providing a second prompt to the LLMs instructions to generate a relevancy annotation to the content items of the first data set; providing as a second input to the LLMs at least a portion of the data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 18. The non-transitory computer readable medium of any one of Examples 15-17, further comprising the operations of: wherein the determined operation is to further perform processing of the generated data set; and providing a second prompt to the LLMs instructions to generate a relevancy annotation to the content items of the first generated data set; providing as a second input to the LLMs at least a portion of the first generated data set of content items; causing execution of the LLM to process the second prompt with the provided second input; receiving, as an output from the LLMs, a second generated data set including a description of the content items where the content items have an association relevancy annotation for the content item; and determining, by the one or more processors, an operation to be performed based on the relevancy annotations of the second generated data set.

Example 19. The non-transitory computer readable medium of any one of Examples 15-18, further comprising the operations of: wherein the determined operation is to generate a message for display to a user interface that no relevant items were found.

Example 20. The non-transitory computer readable medium of any one of Examples 15-19, further comprising the operations of: wherein the LLMs generate a relevancy annotation based on a numeric scale indicating a relevancy of a content item according to search criterion and description of the content items in the first data set.

Example 21. The non-transitory computer readable medium of any one of Examples 15-20, further comprising the operations of: wherein the LLMs generate a textual reason and/or description of why or how a respective content item of the first generated data set was given a relevancy annotation value.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method performed by one or more processors, comprising operations of:
   receiving, via a platform comprising the one or more processors, a natural language-based input comprising a query associated with a client device;
   generating, by the one or more processors, a search criterion for the natural language-based input associated with the client device;
   assembling, by the one or more processors, a data set of content items including a description of content items;
   determining whether the query is relevant to a domain and:
      in response to determining that the query is relevant to the domain, performing an LLM-based relevancy annotation operation of:
         providing a first prompt to one or more large language models (LLMs), the first prompt comprising instructions to generate relevancy annotations for the data set of content items according to the search criterion, wherein the first prompt further comprises conditional execution logic for different contextual situations associated with the natural language-based input;
         providing as an input to the one or more LLMs at least a portion of the data set of content items;
         executing the one or more LLMs to process the first prompt with the at least a portion of the data set of content items and generate, utilizing the one or more LLMs and based on the at least a portion of the data set of content items, an annotation for each content item of the data set of content items; and
         receiving, from the one or more LLMs, a first generated data set including a description of the at least a portion of the data set of content items and corresponding relevancy annotations for the at least a portion of the data set of content items; or
      in response to determining that the query is not relevant to the domain, aborting the LLM-based relevancy annotation operation;
   providing the data set of content items and the first generated data set to a blender allocation system and generating a set of allocated content items, where irrelevant content items are removed by the blender allocation system;
   providing to a presentation generator system the set of allocated content items, where the set of allocated content items are formatted by the presentation generator system for presentation to a user interface of the client device; and
   causing, by the presentation generator system, a portion of the set of allocated content items to be displayed via a user interface of the client device.

2. The computer-implemented method of claim 1, further comprising the operations of:

providing a second prompt to the one or more LLMs, the second prompt comprising instructions to generate additional relevancy annotations for the content items of the data set of content items;
providing as a second input to the one or more LLMs at least an additional portion of the data set of content items;
executing the one or more LLMs to process the second prompt with the second input;
receiving, as an output from the one or more LLMs, a second generated data set including a description of the at least an additional portion of the data set of content items and corresponding additional relevancy annotations for the at least an additional portion of the data set of content items; and
determining, by the one or more processors, an operation to be performed based on the corresponding additional relevancy annotations of the second generated data set.

3. The computer-implemented method of claim 1, further comprising the operations of:
providing a second prompt to the one or more LLMs, the second prompt comprising instructions to generate additional relevancy annotations for the content items of the first generated data set;
providing as a second input to the one or more LLMs at least a portion of the first generated data set;
executing the one or more LLMs to process the second prompt with the second input;
receiving, from the one or more LLMs, a second generated data set including an additional description of the at least a portion of the data set of content items of the first generated data set and corresponding additional relevancy annotations; and
determining, by the one or more processors, an operation to be performed based on the corresponding additional relevancy annotations of the second generated data set.

4. The computer-implemented method of claim 1, further comprising the operations of:
generating a message for display to the user interface that no relevant items were found.

5. The computer-implemented method of claim 1, further comprising the operations of:
executing the one or more LLMs to generate a relevancy annotation based on a numeric scale indicating a relevancy of a content item according to the search criterion and a description of the at least a portion of the data set of content items.

6. The computer-implemented method of claim 1, further comprising the operations of:
executing the one or more LLMs to generate a textual reason and/or description of why or how a respective content item of the first generated data set was given a relevancy annotation value.

7. The computer-implemented method of claim 1, further comprising bypassing the LLM-based relevancy annotation based on one or more cached relevancy annotations associated with the data set of content items.

8. A system comprising one or more processors configured to perform operations of:
receiving, via a platform comprising the one or more processors, a natural language-based input comprising a query associated with a client device;
generating, by the one or more processors, a search criterion for the natural language-based input associated with the client device;
assembling, by the one or more processors, a data set of content items including a description of content items;
determining whether the query is relevant to a domain and:
in response to determining that the query is relevant to the domain, performing an LLM-based relevancy annotation operation of:
providing a first prompt to one or more large language models (LLMs), the first prompt comprising instructions to generate relevancy annotations for the data set of content items according to the search criterion, wherein the first prompt further comprises conditional execution logic for different contextual situations associated with the natural language-based input;
providing as an input to the one or more LLMs at least a portion of the data set of content items;
executing the one or more LLMs to process the first prompt with the at least a portion of the data set of content items and generate, utilizing the one or more LLMs and based on the at least a portion of the data set of content items, an annotation for each content item of the data set of content items; and
receiving, from the one or more LLMs, a first generated data set including a description of the at least a portion of the data set of content items and corresponding relevancy annotations for the at least a portion of the data set of content items; or
in response to determining that the query is not relevant to the domain, aborting the LLM-based relevancy annotation operation;
providing the data set of content items and the first generated data set to a blender allocation system and generating a set of allocated content items, where irrelevant content items are removed by the blender allocation system;
providing to a presentation generator system the set of allocated content items, where the set of allocated content items are formatted by the presentation generator system for presentation to a user interface of the client device; and
causing, by the presentation generator system, a portion of the set of allocated content items to be displayed via a user interface of the client device.

9. The system of claim 8, further comprising the operations of:
providing a second prompt to the one or more LLMs, the second prompt comprising instructions to generate additional relevancy annotations for the content items of the data set of content items;
providing as a second input to the one or more LLMs at least an additional portion of the data set of content items;
executing the one or more LLMs to process the second prompt with the second input;
receiving, as an output from the one or more LLMs, a second generated data set including a description of the at least an additional portion of the data set of content items and corresponding additional relevancy annotations for the at least an additional portion of the data set of content items; and
determining, by the one or more processors, an operation to be performed based on the corresponding additional relevancy annotations of the second generated data set.

10. The system of claim 8, further comprising the operations of:
providing a second prompt to the one or more LLMs, the second prompt comprising instructions to generate additional relevancy annotations for the content items of the first generated data set;
providing as a second input to the one or more LLMs at least a portion of the first generated data set;
executing the one or more LLMs to process the second prompt with the second input;
receiving, from the one or more LLMs, a second generated data set including an additional description of the at least a portion of the data set of content items of the first generated data set and corresponding additional relevancy annotations; and
determining, by the one or more processors, an operation to be performed based on the corresponding additional relevancy annotations of the second generated data set.

11. The system of claim 8, further comprising the operations of:
generating a message for display to the user interface that no relevant items were found.

12. The system of claim 8, further comprising the operations of:
executing the one or more LLMs to generate a relevancy annotation based on a numeric scale indicating a relevancy of a content item according to the search criterion and a description of the at least a portion of the data set of content items.

13. The system of claim 8, further comprising the operations of:
executing the one or more LLMs to generate a textual reason and/or description of why or how a respective content item of the first generated data set was given a relevancy annotation value.

14. A non-transitory computer readable medium storing a software program comprising data and computer implementable instructions that when executed by at least one processor cause the at least one processor to perform operations of:
receiving, via a platform comprising the at least one processor, a natural language-based input comprising a query associated with a client device;
generating a search criterion for the natural language-based input associated with the client device;
assembling a data set of content items including a description of content items;
determining whether the query is relevant to a domain and:
in response to determining that the query is relevant to the domain, performing an LLM-based relevancy annotation operation of:
providing a first prompt to one or more large language models (LLMs), the first prompt comprising instructions to generate relevancy annotations for the data set of content items according to the search criterion, wherein the first prompt further comprises conditional execution logic for different contextual situations associated with the natural language-based input;
providing as an input to the one or more LLMs at least a portion of the data set of content items;
executing the one or more LLMs to process the first prompt with the at least a portion of the data set of content items and generate, utilizing the one or more LLMs and based on the at least a portion of the data set of content items, an annotation for each content item of the data set of content items; and
receiving, from the one or more LLMs, a first generated data set including a description of the at least a portion of the data set of content items and corresponding relevancy annotations for the at least a portion of the data set of content items; or
in response to determining that the query is not relevant to the domain, aborting the LLM-based relevancy annotation operation;
providing the data set of content items and the first generated data set to a blender allocation system and generating a set of allocated content items, where irrelevant content items are removed by the blender allocation system;
providing to a presentation generator system the set of allocated content items, where the set of allocated content items are formatted by the presentation generator system for presentation to a user interface of the client device; and
causing, by the presentation generator system, a portion of the set of allocated content items to be displayed via a user interface of the client device.

15. The non-transitory computer readable medium of claim 14, further comprising the operations of:
providing a second prompt to the one or more LLMs, the second prompt comprising instructions to generate additional relevancy annotations for the content items of the data set of content items;
providing as a second input to the one or more LLMs at least an additional portion of the data set of content items;
executing the one or more LLMs to process the second prompt with the second input;
receiving, as an output from the one or more LLMs, a second generated data set including a description of the at least an additional portion of the data set of content items and corresponding additional relevancy annotations for the at least an additional portion of the data set of content items; and
determining, by the one or more processors, an operation to be performed based on the corresponding additional relevancy annotations of the second generated data set.

16. The non-transitory computer readable medium of claim 14, further comprising the operations of:
providing a second prompt to the one or more LLMs, the second prompt comprising instructions to generate additional relevancy annotations for the content items of the first generated data set;
providing as a second input to the one or more LLMs at least a portion of the first generated data set;
executing the one or more LLMs to process the second prompt with the second input;
receiving, from the one or more LLMs, a second generated data set including an additional description of the at least a portion of the data set of content items of the first generated data set and corresponding additional relevancy annotations; and
determining, by the one or more processors, an operation to be performed based on the corresponding additional relevancy annotations of the second generated data set.

17. The non-transitory computer readable medium of claim 14, further comprising the operations of:
generating a message for display to the user interface that no relevant items were found.

18. The non-transitory computer readable medium of claim 14, further comprising the operations of:
executing the one or more LLMs to generate a relevancy annotation based on a numeric scale indicating a relevancy of a content item according to the search criterion and a description of the at least a portion of the first data set of content items.

19. The non-transitory computer readable medium of claim 14, further comprising the operations of:
executing the one or more LLMs to generate a textual reason and/or description of why or how a respective content item of the first generated data set was given a relevancy annotation value.

20. The non-transitory computer readable medium of claim 14, further comprising bypassing the LLM-based relevancy annotation based on one or more cached relevancy annotations associated with the data set of content items.

* * * * *